Patented Nov. 22, 1949

2,489,038

UNITED STATES PATENT OFFICE 2,489,038

PURIFICATION OF 2-AMINOTHIAZOLE

Erwin Kuh, New Brunswick, and Warren B. Neier, North Plainfield, N. J., assignors to American Cyanamid Company, New York, N. Y., a corporation of Maine No Drawing. Application November 6, 1945, Serial No. 627,098

14 Claims. (Cl. 260—302)

This invention relates to an improved method of separating 2-aminothiazole from solutions containing the same.

2-aminothiazole is produced on a large scale as an intermediate for the preparation of 2-sulfanilamidothiazole, generally referred to as sulfathiazole. A high degree of purity is required in the final product which is a pharmaceutical and it is, therefore, necessary to separate 2-aminothiazole from impurities which are present in reaction mixtures containing the same. In general 2-aminothiazole is prepared by condensing thiourea with chlorinated vinyl acetate. The reaction mixture is strongly acid and contains the 2-aminothiazole in the form of its hydrochloride from which 2-aminothiazole may be set free by neutralization. However, the crude reaction mixture or an aqueous solution of 2-aminothiazole obtained by neutralization still contains impurities and it is desirable to recover the 2-aminothiazole therefrom without loss and in a pure form.

According to the present invention it has been found that 2-aminothiazole reacts with sulfur dioxide preferably at elevated temperatures to produce a compound which is relatively insoluble in water and can be separated by precipitation and filtration. The range of temperatures useful in practical operation is from 25° to 105° C., excellent results being obtained at temperatures from 70° to 90° C., which may be considered the preferred range. The compound appears to have an empirical formula corresponding to a bisulfite. However, the behavior of the process and the chemical characteristics of the compound make it unlikely that the product is an ordinary amine salt and, therefore, it is not intended to limit the present invention to any definite theory of the exact chemical constitution of the compound produced.

When an aqueous solution of 2-aminothiazole is treated with sulfur dioxide, preferably in excess, the formation of the insoluble product does not proceed very rapidly and, in the cold, precipitation does not begin until the mixture has stood for some time. When, however, the reaction mixture is heated to a temperature somewhat below the boiling point of water the reaction proceeds rapidly and on cooling precipitation takes place promptly. The use of moderate heating is, therefore, a preferred modification of the present invention.

It is an advantage of the present invention that the proportions of the reactants are not critical. There must, of course, be sufficient sulfurous acid and aminothiazole present so that the bisulfite reaction product precipitates as a solid. Formation of the reaction product does not take place in strongly acid solution and, therefore, when a reaction mixture containing a hydrochloride of 2-aminothiazole is to be treated we prefer to use sodium bisulfite, metabisulfite or similar sulfurous acid salts. The pH of the reaction mixture is not critical but in general should be between 2.5 and 5. The reaction proceeds preferably at the moderately elevated temperatures which are also preferred in the reaction of 2-aminothiazole with sulfur dioxide. Temperatures from 70–90° C. give excellent results. The actual reaction produces a product of 2-aminothiazole and sulfurous acid. It is immaterial whether the sulfurous acid reacts as a water solution of sulfur dioxide or is obtained from an acid sulfite. In the specification and claims the reaction will be referred to generally as one between 2-aminothiazole and sulfurous acid, regardless of the source of the sulfur dioxide or sulfurous acid.

After isolation of the sulfur dioxide or bisulfite reaction product it may be decomposed to set free aminothiazole by boiling with strong mineral acid such as sulfuric acid. The use of alkali is less desirable as much lower yields are obtained and the aminothiazole produced is often of lower purity. The fact that the aminothiazole is not readily set free by alkali is an additional reason for believing that probably the compound is not an ordinary amine salt of sulfurous acid.

The present invention is not limited to any particular method of obtaining pure aminothiazole from the bisulfite compound but we prefer to use a method of boiling with strong mineral acids.

The invention will be described in greater detail in conjunction with the following specific examples, the parts being by weight.

*Example 1*

Sulfur dioxide is passed into an aqueous solution of 2-aminothazole until an excess of sulfur dioxide has been used. The solution is allowed to stand until no more solid compound precipitates, whereupon the precipitate is filtered, washed with cold water and dried at 70° C. A practically quantitative yield is obtained.

*Example 2*

Sulfur dioxide is passed into an aqueous solution of 2-aminothiazole heated to about 80° C. After an excess of sulfur dioxide has been introduced the solution is cooled, filtered, washed and dried as described in Example 1. The yields are substantially the same, but the time cycle is much shorter as the reaction mixture does not have to stand for a long time while precipitation takes place.

Example 3

The strongly acid solution resulting from the condensation of thiourea with chlorinated vinyl acetate in water is neutralized to a pH of 4 using sodium carbonate or sodium hydroxide. A crude aqueous solution of 2-aminothiazole hydrochloride results, which is treated with sodium bisulfite or sodium metabisulfite in the proportion of 104 parts of bisulfite or 114 parts of metabisulfite per 100 parts of 2-aminothiazole theoretically present. This represents an excess of bisulfite. The mixture is then slowly heated up and at about 70° C. an exothermic reaction begins. After the reaction is complete the mixture, which constitutes a slurry of the aminothiazole bisulfite reaction product, is then heated for a short period at 70–90° C., cooled and filtered at a temperature of 20° C. or lower. The aminothiazole bisulfite product obtained is then thoroughly washed with cold water and dried at 50–70° C. A product of high purity is obtained in high yield.

Example 4

A partially neutralized reaction mixture such as is described in Example 3 is heated up to 85–90° C. and the sodium bisulfite or metabisulfite gradually added at the elevated temperature, the amounts of bisulfite or metabisulfite being the same as in Example 3. After all of the bisulfite has been added the resulting slurry is maintained at the same temperature for a short period of time with stirring and then is cooled, filtered and the precipitate washed as described in Example 3.

This case is in part a continuation of our copending application Serial No. 471,370, filed January 5, 1943, now abandoned.

We claim:

1. In a process for the production of 2-aminothiazole from an aqueous solution thereof which includes the steps of precipitating 2-aminothiazole as an insoluble reaction product, isolating said reaction product, and in a separate step decomposing said reaction product to yield 2-aminothiazole, the improvements which comprise forming more than one molar equivalent of sulfurous acid in said aqueous solution, reacting the 2-aminothiazole in said solution with said sulfurous acid at a temperature of 25° C.–105° C. to form a 2-aminothiazole-sulfurous acid reaction product, and precipitating and isolating said reaction product.

2. The process of claim 1, wherein said sulfurous acid is formed in situ by introduction of more than one molar equivalent of sulfur dioxide into said aqueous solution.

3. The process of claim 1, wherein the pH of said aqueous solution is 2.5–5 and said sulfurous acid is formed in situ by introduction of more than one molar equivalent of sodium bisulfite into said aqueous solution.

4. The process of claim 1, wherein the pH of said aqueous acid solution is between 2.5 and 5.

5. The process of claim 1, wherein the reaction temperature is between 70° C. and 90° C.

6. The process of claim 1, wherein the reaction mixture is cooled after reaction is complete before the 2-aminothiazole-sulfurous acid reaction product is recovered.

7. The process of claim 1, wherein the 2-aminothiazole-sulfurous acid reaction product after isolation is decomposed to liberate free 2-aminothiazole.

8. In a process for the production of 2-aminothiazole from the crude, strongly acidic solution of 2-aminothiazole which is formed when chlorinated vinyl acetate is condensed with an aqueous solution of thiourea, which includes the steps of precipitating 2-aminothiazole as a water-insoluble reaction product, isolating said reaction product and, in a separate step, decomposing said reaction product to yield 2-aminothiazole, the improvements which comprise forming more than one molar equivalent of sulfurous acid in said solution, reacting the 2-aminothiozole in said solution with said sulfurous acid at a temperature of 25° C.–105° C. to form a 2-aminothiazole-sulfurous acid reaction product, and precipitating and isolating said reaction product.

9. The process of claim 8, wherein said sulfurous acid is formed in situ by introduction of more than one molar equivalent of sulfur dioxide into said aqueous solution.

10. The process according to claim 8, wherein the pH of said aqueous solution is 2.5–5 and said sulfurous acid is formed in situ by introduction of more than one molar equivalent of sodium bisulfite into said aqueous solution.

11. The process of claim 8, wherein the pH of said aqueous acid solution is between 2.5 and 5.

12. The process of claim 8, wherein the reaction temperature is between 70° C. and 90° C.

13. The process of claim 8, wherein the reaction mixture is cooled after reaction is complete before the 2-aminothiazole-sulfurous acid reaction product is recovered.

14. The process of claim 8, wherein the 2-aminothiazole-sulfurous acid reaction product after isolation is decomposed to liberate free 2-aminothiazole.

ERWIN KUH.
WARREN B. NEIER.

REFERENCES CITED

The following references are of record in the file of this patent:

UNITED STATES PATENTS

| Number | Name | Date |
| --- | --- | --- |
| 1,931,077 | Lubs et al. | Oct. 17, 1933 |